United States Patent [19]

Date

[11] 4,149,793
[45] Apr. 17, 1979

[54] PHOTOGRAPHIC CAMERA

[75] Inventor: Nobuaki Date, Kawasaki, Japan

[73] Assignee: Canon Kabushiki Kaisha, Tokyo, Japan

[21] Appl. No.: 850,131

[22] Filed: Nov. 10, 1977

[30] Foreign Application Priority Data

Nov. 19, 1976 [JP] Japan ................................ 51-139218

[51] Int. Cl.² .......................... G03B 1/04; G03B 1/12; G03B 17/02
[52] U.S. Cl. .................................. 354/214; 354/173; 354/288
[58] Field of Search ............... 354/170, 171, 172, 173, 354/212, 214, 215, 288

[56] References Cited

U.S. PATENT DOCUMENTS 3,096,699   7/1963   Harvey et al. .................... 354/288 X
3,511,154   5/1970   Simon .................................. 354/214

FOREIGN PATENT DOCUMENTS 722587   1/1955   United Kingdom ..................... 354/214

Primary Examiner—Michael L. Gellner
Attorney, Agent, or Firm—Toren, McGeady and Stanger

[57] ABSTRACT

A roll film camera of the type in which the exposed film must be rewound onto a supply reel within a magazine before the back cover of the camera is opened to remove the magazine from its chamber within the camera body. As a rewinding crank is operated by hand, when the film nears the terminal end as detected by a probe extending into the transport path of the film, motion of the handcrank begins to be transmitted to an operating member for controlling a locking and unlocking operation of the back cover. It is thereby insured that the film is protected from fogging when the magazine is removed. Even with a camera having a motor drive unit, it is possible to leave the film unrewound protruding from the magazine by a limited terminal length which provides for easy handling of the film in the later processing operation.

9 Claims, 3 Drawing Figures

PHOTOGRAPHIC CAMERA

BACKGROUND OF THE INVENTION

1. Field of the Invention

This invention relates to roll film cameras and more particularly to a protective mechanism for use in such camera having a back cover operated to load and unload a film magazine into and from a chamber therefor within the camera body. The mechanism of the present invention makes it possible to open the back cover when the exposed film is rewound onto the supply reel within the magazine and to leave the film unrewound by a limited terminal length even when a motor drive unit is used to perform the rewinding operation.

2. Description of the Prior Art

The prior constructions of locking mechanisms for roll film cameras in one form include a control knob accessible from the outside of the camera housing and arranged upon upward manual movement to open the back cover and upon downward movement to become capable of locking the back cover in the closed position. In another form, the locking mechanism is operatively associated with a film rewinding crank for controlling opening and closing operation of the back cover.

With such manually operable locking mechanism, therefore, the operator is required to rely upon his own sense of feeling to detect the slight shock felt by his fingers operating the film rewinding crank just when the terminal end of the film passes from the sprocket before the crank is stopped from further rotation and then moved upward to open the back cover. Otherwise, the film will be fogged at a portion left unrewound into the magazine. Because of difficulties in distinguishing this shock from others, beginners and amateurs of insufficient experience are liable with high probability to open the back cover before the rewinding of the film has been completed. Aside from his difficulties in determining the completion of the rewinding operation, the average operator is liable to perform accidental manipulation of the locking mechanism with the result that a large number of film frames are photographed in blank, or wasted. In order to avoid such faulty operation it has been the common practice to rotate the handcrank in excess with the film entirely retracted into the magazine. In this case, however, it is necessary to break the magazine in order to extract the film before the film is processed.

It is an object of the present invention to provide an improved camera of the roll film type in which rewinding of the exposed film is a necessary prelude to removal of the film magazine.

Another object is to provide an improved camera of the type described with a mechanism for protecting the film from fogging when the magazine is removed.

To achieve this, in one embodiment a sensing mechanism detects whether or not the film is left unrewound onto the supply reel in the magazine and the result of the detection controls the actuation of locking means for the back cover of the camera.

Still another object is to provide a protective mechanism of the character described which also serves to automatically open the back cover when all the picture frames have been retracted into the magazine as the rewinding crank is operatively connected to the locking means.

A further object is to provide an improved motor driven camera of the type in which the back cover can not be opened until all the effective picture frames have been retracted into the magazine and in which the film rewinding shaft can be driven by the motor until that particular time.

A further object is to provide a protective mechanism capable of leaving the film unrewound by a limited terminal length which serves as the grasping end of the film in the later film processing operation.

These and other objects and features of the present invention will become apparent from the following detailed description of a preferred embodiment thereof taken in conjunction with the accompanying drawings in which:

DESCRIPTION OF THE PREFERRED EMBODIMENT

Figure 1:
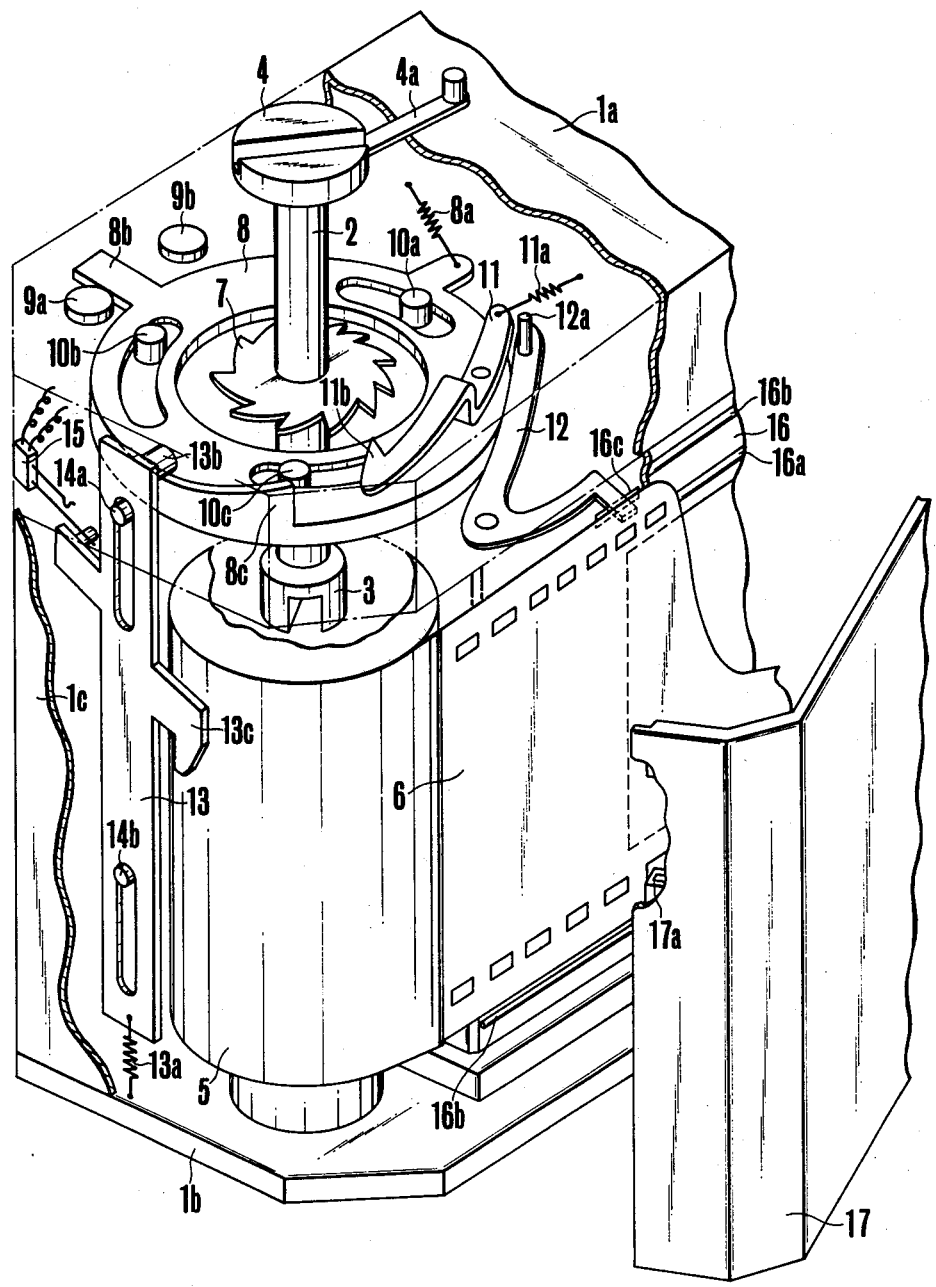
FIG. 1 is a fragmentary perspective view of a roll film camera with its back cover opened and with a portion of the housing thereof broken away to illustrate one embodiment of a protective mechanism according to the present invention.

Referring to FIG. 1, there is shown a fragment of the camera body 1 having top, bottom and front panels 1a, 1b and 1c fixedly connected to each other to constitute a housing together with a rear panel which is pivoted at the opposite side to that shown to serve as a back cover 17. Movably mounted through a hole provided in the wall of the top panel 1a is a film rewinding shaft 2 having a foldable crank, with a knob 4 and a crank 4a being shown in the erected position, fixedly secured to the top end thereof, the opposite end of which is configured to a forked shape for engagement with a supply reel within a film magazine 5 loaded in a chamber within the camera body 1. The magazine 5 initially contains a roll of unexposed film 6 with its leading end withdrawn by a limited preliminary length to serve as the grasping end of the film in extracting the film over a film gate shown by phantom lines.

The protective mechanism of the present invention includes a toothed wheel 7 coaxially fixedly mounted on the rewinding shaft 2 and an annular member 8 having three arcuate slots evenly spaced from each other and through which respective guide pins 10a to 10c extends from the framework structure of the camera to permit rotative movement of the annular member 8 about the common axis of the shaft 2. In order to limit clockwise and counter-clockwise movement of the annular member 8 there are provided a pair of stopper pins 9b and 9a spaced from each other by a distance corresponding to the range of movement of the annular member 8. An arm 8b cooperates with either of the stopper pins 9a and 9b depending respectively upon the action of a bias spring 8a for the annular member 8 and upon the rewinding torque of the handcrank 4a through an arresting lever 11.

The arresting lever 11 is pivotally mounted on the upper side of the annular member 8 and biased by a spring 11a in a clockwise direction to urge its pawl 11b for engagement with one of the teeth of the wheel 7. The lever 11 constitutes a lever differential means together with a second lever 12 which is pivotally mounted on the camera structure framework and serves to magnify a signal representative of whether or not the film lies behind the film gate. For this purpose, the lever 12 has a long arm, the end of which acts on the end of the arresting lever 11 through a pin 12a upwardly extending therefrom and a short arm, the end of which extends through a slot 16c in a space between an inner and an outer film guide rail 16a and 16b at a location adjacent a line of the left edge of a framing aperture or film gate to serve as a film detecting probe.

The annular member 8 is provided with a camera back cover locking control cam 8c constructed in the form of an axially extending taper-shaped or elevated cam. Cooperating with this cam 8c is a vertically disposed slide bar 13 acting as a locking member for the back cover 17 in engagement at its hook 13c with a recess 17a and also as an actuating member for a motor drive control switch 15 in engagement at its arm 13d with a movable contact of the switch 15, and being provided at its upper end with a perpendicularly extending pin 13b which rides on the camming surface 8c under the action of a bias spring 13a for the slide bar 13. The slide bar 13 is vertically movable and supported by pin-slot connections 14a and 14b.

The operation of the camera of FIG. 1 is as follows: After all the film frames available in the magazine 5 have been exposed while being wound up on a take-up reel (not shown) of the camera, the operator will erect and turn the crank 4a in a clockwise direction to drive the supply reel within the magazine 5 through engagement with the fork 3, whereby the exposed film is rewound onto the supply reel. During this rewinding operation, the toothed wheel 7 is also rotated but is not acted on the annular member 8 because the film 6 still remains behind the film gate to depress the probe 12b against the force of the spring 11a. In other words, as long as the film 6 is not rewound through the entire effective length as existing on the guide surfaces 16a and 16b, motion of the rewinding shaft 2 is not transmitted to the annular member 8 and therefore the back cover 17 can not be opened.

When the leading end of the film 6 passes the detecting probe 12b, the lever 12 is turned clockwise and at the same time the arresting lever 11 is turned clockwise under the action of the spring 11a so that the pawl 11b is brought into arresting engagement with one of the teeth of the wheel 7. Therefore, the operator is immediately made conscious of the fact that all the film frames have been rewound into the magazine 5.

If he desires to open the back cover 17, he only need to apply a somewhat larger pressure on the crank 4a in the same direction as above. At this time, the annular member 8 is turned clockwise against the combined force of the springs 8a, 11a and 13a until the arm 8b abuts against the stopper pin 9b, while simultaneously moving the slide bar 13 upward against the force of the spring 13a by the camming action of the cam 8c and follower pin 13b, whereby the hook 13c is moved away from the recess 17a to permit the back cover 17 to be opened under the action of a spring (not shown) and the motor control switch 15 is closed.

When the operator releases the forward pressure on the handcrank 4a, the annular member 8 is turned counter-clockwise under the action of the spring 8a until the arm 8b abuts against the stopper pin 9a, while simultaneously permitting the slide bar 13 to move down under the action of the spring 13a to the initial position where the locking action for the back cover 17 is achieved.

It is to be noted that the rewinding of the film which is intended to be a necessary prelude to removal of the magazine can be accomplished to protect the film from fogging without recourse to visual signals. The magazine can be removed from the chamber within the camera body in a conventional manner such as by pulling upward the crank shaft 2. Again it is to be noted here that the protective mechanism of the invention also functions to prevent the film from leaving the film unrewound except to a limited terminal length which serves as the grasping end of the film to facilitate handling of the film either in the processing operation, or in the repeated use of the same magazine after being once removed from the camera body.

After the old magazine has been removed, a new magazine may be inserted into the chamber while the crank shaft 2 remains pulled upward. Then the crank shaft 2 will be pushed down to set the magazine in position. Next, the operator will withdraw the film over the film gate to the take-up reel and connect it therewith, and then close the back cover 17, thereby applying an inward pressure to the film detecting probe 12b, and disengaging the arresting lever 11 at its pawl 11b from the toothed wheel 7. Accordingly, it is impossible to open the once closed back cover 17 unless the withdrawn part of the film has been retracted into the magazine by operating the rewinding crank 4a.

If the back cover 17 is closed with no magazine loaded in the camera, as the arresting lever 11 is in the engaging state with the toothed wheel 7 the operator can open the back cover at any time by turning the crank 4a through a short distance in the rewinding direction, provided that the crank shaft 2 is set in the downmost position.

Figure 2:
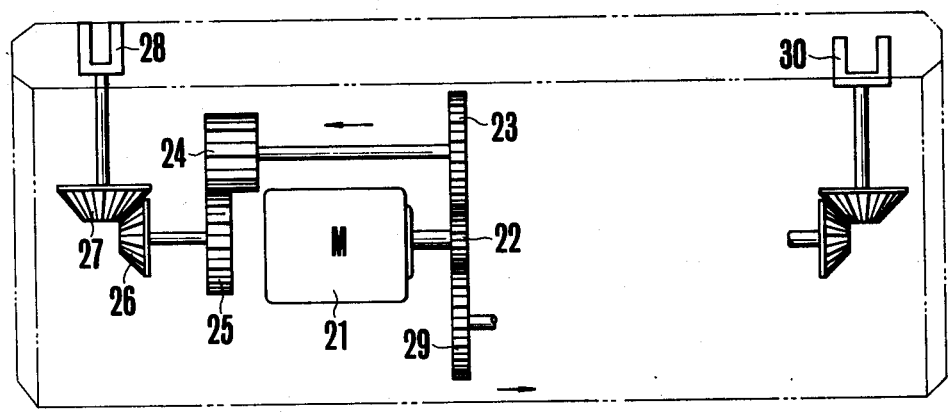
FIG. 2 is a schematic elevational view of the basic parts of a motor drive unit usable with the camera of FIG. 1.
Figure 3:
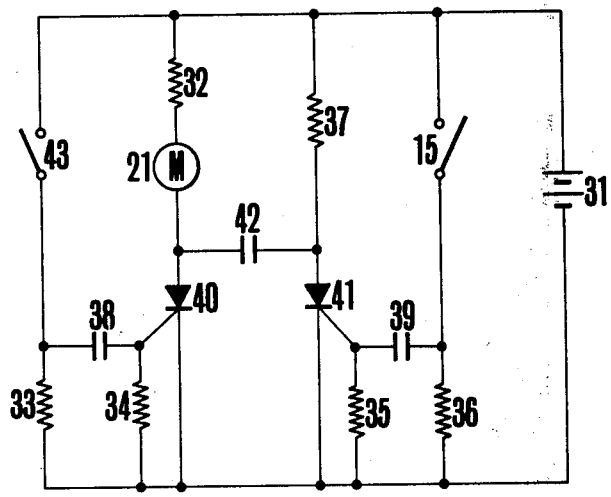
FIG. 3 is a diagram of a motor control circuit in the unit of FIG. 2.

FIGS. 2 and 3 show an example of a motor drive unit usable with the camera of FIG. 1. Referring first to FIG. 2, the motor drive unit includes an electrical motor M or 21 having an output shaft on which a pinion 22 is fixedly mounted. Although two gears 23 and 29 are shown as engaging the pinion 22 at a time, the rewinding operation is performed with the gear 23 set in engagement with the pinion 22, while the gear 29 is taken out of engagement with the pinion 22, as indicated by an arrow. A gear train for the rewinding operation further includes a pinion 24 connected to the common shaft of the gear 23, a gear 25 engaging with the pinion 24, a bevel gear 26 connected to the common shaft of the gear 24 and engaging with a bevel gear 27 of which the shaft is connected to a coupler which is arranged to be engaged with an adapter of the camera when the unit is attached to the camera. The gear 29 constitutes part of a gear train through which motion of the motor 21 is transmitted to a winding coupler 30 and therefrom introduced into the take-up reel within the camera body.

FIG. 3 shows an example of the circuitry of the motor drive unit of FIG. 2 as including an electrical power source or battery 31, a winding of the motor 21 connected between the positive and negative terminals of the battery 31 through a power supply control element or thyristor 40 having a gating control input connected to an output of a differentiating circuit which includes a capacitor 38. In order to cut off the power supply to the motor M as soon as the terminal end of the film comes to pass at the detecting probe 12b, the anode and cathode of the thyristor 40 is short-circuited through a commutation capacitor 42 and through a second thyristor 41 having a gating control input connected to an output of a differentiating circuit which includes a capacitor 39 and which cooperates with the switch 15 of FIG. 1 as an actuator therefor. A start switch for the motor M is indicated at 43. All necessary resistors are indicated at 32 to 37 inclusive.

With the motor drive unit of FIGS. 2 and 3 attached to the camera of FIG. 1, after the rewinding mode has been rendered operative, when the start switch 43 is closed, the first differentiating circuit of the capacitor 38 and the resistor 34 produces an actuating pulse which is applied to the gating control input of the first thyristor 40, whereby the motor 21 is energized. As a current flowing through the resistor 32 is pre-adjusted to a value larger than that necessary to maintain the thyristor 40 in the conducting state, the thyristor 40 is self-sustained in the conducting state, and therefore the motor 21 continues to rotate. Motion of the motor 21 is transmitted through the gear train 22 to 27 to the rewinding coupler 28 and therefrom introduced into the supply reel in the magazine 5, whereby the supply reel is driven to rewind the film thereon. At this time, the crank shaft 2 is also rotated in unison with the supply reel. When the probe 12b has detected the terminal end of the film 6, the slide bar 31 is actuated in a manner similar to that shown in connection with FIG. 1 to close the switch 15, causing the second differential circuit of the capacitor 39 and the resistor 35 to produce an actuating pulse which is applied to the gating control input of the second thyristor 41. As the second thyristor 41 conducts, the voltage of the commutation capacitor 42 is instantaneously applied to the first thyristor 40 to cut off the power supply to the motor 21. The resistor 37 which is connected in series with the second thyristor 41 has so high a resistance value that the first thyristor 41 is rendered non-conducting soon after the conduction of the second thyristor 42. Because of occurrence of no next pulse applied to the first thyristor 40, the motor 21 remains in the de-energized state to permit the annular member 8 to return to the initial position under the action of the spring 8a and the switch 15 to be opened again. By opening the start switch 43, the motor driven rewinding operation is terminated.

It is to be noted here that driving of the supply reel by the motor can be automatically stopped in response to the termination of rewinding of the film except for a limited terminal length, and at the same time, the back cover is automatically opened so that the magazine can be removed.

It will be seen from the foregoing description that the described emnbodiment of the invention accomplishes the above-mentioned objects by providing an automatic rewinding control mechanism and associated motor control switch.

What is claimed is:

1. A back cover opening and closing device for a camera including:
   (a) a back cover;
   (b) opening and closing means for opening and closing said back cover, said means being movable between a closing position where said back cover is set to a closed state and an opening position where said back cover is set to an open state;
   (c) operating means for displacing said opening and closing means from one of the closing and opening positions to the other;
   (d) film rewinding means;
   (e) transmitting means positioned between said film rewinding means and said operating means, said transmitting means being movable between a first position where said operating means is linked to said film rewinding means and a second position where said operating means is not linked to said film rewinding means; and
   (f) film detecting means responsive to detecting the presence of the film for moving said transmitting means to the second position and responsive to detecting the absence of the film for moving said transmitting means to the first position;
   whereby when said film detecting means detects the absence of the film, said transmitting means is moved to the first position so that said operating means is actuated by the rewinding force of said film rewinding means to displace the said opening and closing means from the closing position to the opening position.

2. A back cover opening and closing device for a camera according to claim 1, wherein said operating means is a rotatable circular plate having a cam portion at the periphery thereof and arranged upon rotation to displace said opening and closing means to the opening position by the cam portion.

3. A back cover opening and closing device for a camera according to claim 2, wherein said transmitting means comprises a ratchet provided in said film rewinding means and an engaging member means provided in said circular plate for selectively engaging said ratchet, and for coupling the rewinding torque of said film rewinding means to said circular plate to rotate said circular plate when said engaging member is engaged with the ratchet.

4. A back cover opening and closing device for a camera according to claim 3, further including a film guide surface provided with film guide rails, and wherein said detecting means has a detecting member means responsive to the absence of the film on the film guide surface for causing said engaging member means to engage with said ratchet.

5. A back cover opening and closing device for a camera including:
   (a) a back cover;
   (b) locking means for said back cover, said means being movable between a position where said back cover is locked, and a position where the lock is released;
   (c) operating means movable between a first position where said locking means is set to the locking position and a second position where said locking means is set to the lock releasing position;
   (d) biasing means for urging said operating means always in a direction toward the first position;
   (e) film rewinding means;
   (f) transmitting means positioned between said film rewinding means and said operating means, said transmitting means being movable between a transmitting position where said operating means is linked to said film rewinding means and a transmission releasing position where said operating means is not linked to said film rewinding means and when set in the transmitting position for causing said operating means to be moved to the second position by the rewinding action of said film rewinding means; and
   (g) film detecting means responsive to the presence of the film for causing said transmitting means to be moved to the transmission releasing position and responsive to the absence of the film for causing said transmitting means to be moved to the transmitting position, whereby when the said detecting means has detected the presence of the film, the transmission releasing means is moved to the transmitting position and said operating means is moved to the first position by said biasing means so that said locking means is set to the locking position.

6. A back cover opening and closing device for a camera according to claim 5, further including a further biasing means for urging said transmitting means for movement to the transmitting position, and wherein said further biasing means drives said transmitting means for movement to the transmitting position when said detecting means detects the absence of the film.

7. A back cover opening and closing device for a camera according to claim 5, further including:
  (a) driving means for driving said film rewinding means; and
  (b) switching means switchable to a first position when said locking means is in the locking position and to a second position when in the lock releasing position, said switching means when switched to the first position rendering said driving means operative and when switched to the second position rendering said driving means inoperative.

8. A back cover opening and closing device for a camera according to claim 7, further including:
  a start switch for said driving means, said switch initiating operation of said driving means.

9. A back cover opening and closing device for a camera including:
  (a) a back cover;
  (b) operating means for opening and closing said back cover, said operating means being movable between a closing position wherein said back cover is closed, and an opening position wherein said back cover is open;
  (c) film rewinding means;
  (d) transmitting means positioned between said film rewinding means and said operating means, said transmitting means being movable between a first position where said operating means is linked to said film rewinding means and a second position where said operating means is not linked to said film rewinding means; and
  (e) film detecting means responsive to the presence of the film for causing said transmitting means to be moved to the second position and responsive to the absence of the film for causing said transmitting means to be moved to the first position, whereby when said film detecting means has detected the absence of the film, a linking relation between said film rewinding means and said operating means is established so that said operating means is actuated by the rewinding action of said film rewinding means to move from the closing position to the opening position.

* * * * *